United States Patent Office 3,027,363
Patented Mar. 27, 1962

3,027,363
SELECTIVE SULFATION OF AMINO ALCOHOLS AND PRODUCTS THEREOF
Donald T. Warner, Kalamazoo Township, Kalamazoo County, Mich., assignor to The Upjohn Company, Kalamazoo, Mich., a corporation of Michigan
No Drawing. Filed Sept. 22, 1955, Ser. No. 536,017
13 Claims. (Cl. 260—211)

The present invention relates to a novel process and to new organic compounds obtained therein and is more particularly concerned with a new process for the preparation of amino alcohol N-sulfonic acids and to novel amino alcohol N-sulfonic acids and metal salts thereof obtained therein.

It is advantageous under some circumstances to selectively sulfate the amino group of an amino alcohol without sulfating the hydroxy group as well. None of the processes heretofore available has been entirely satisfactory for this purpose, however, in that sulfation of the hydroxyl group could not be entirely avoided.

It has now been found according to the present invention that an amino alcohol can be effectively N-sulfated without O-sulfation by reacting the amino alcohol with a pyridine·sulfur trioxide complex in the presence of sufficient alkali to maintain a pH between about 7 and about 11.5.

The term "amino alcohol" as utilized herein is intended to include those compounds which have separate sulfatable amino and alcohol (non-phenolic) functions and is inclusive of monomeric amino alcohols such as aliphatic amino alcohols, e.g., monoethanolamine, n-butyl-monoethanolamine, diethanolamine, D,L-serine (2-amino-3-hydroxypropanoic acid), 3-aminopropanol, 3-amino-2-butanol, 2-amino-1,3-butanediol, 2-amino-2-methyl-1-propanol, 2-amino-2-ethyl-1,3-propanediol, 2-amino-1-butanol, tris(hydroxymethyl) aminomethane, and the like, and aromatic amino alcohols such as β-amino-α-phenylethanol, α-phenyl-β-methylaminoethanol, and the like. In addition, polymeric amino alcohols such as polysaccharides containing amino groups, e.g., mucopolysaccharides, can also be employed in the present process. Polysaccharides which can be employed include deacetylated chitin, more commonly known as chitosan [Doczi et al., J. Am. Chem. Soc. 75, 1512 (1953)], deacetylated chondroitin sulfat [Wolfrom et al., J. Am. Chem. Soc. 75, 1519 (1953)] hereinafter called neo-chondroitin sulfate, deacetylated hyaluronic acid [Bernfeld, Fed. Proc. 13, 183 (1954)] hereinafter called neo-hyaluronic acid, and the like. These compounds are prepared by deacetylation of the acetyl amino group of the parent compound.

The selective sulfation of the amino group to produce a sulfamic acid group

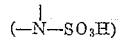

as accomplished by the present invention, makes available a technique which has numerous practical applications. Thus the present invention can be employed in the preparation of nutritionally valuable amino acids from amino primary alcohols by converting the amino group of an amino primary alcohol to a protective sulfamic acid group by the process of the present invention, oxidizing the carbinol group to a carboxyl group, for example, with potassium permanganate, and finally reestablishing the amino group by hydrolyzing the N-sulfated product, e.g., with hydrochloric acid.

The sulfated amino secondary and tertiary alcohols can be utilized in the preparation of detergents and wetting agents. For example, the sulfated amino secondary alcohols can be reacted with ethylene oxide under alkaline conditions to produce an ionic detergent. The sulfated amino tertiary alcohols can be acylated with a long chain fatty acid chloride in the presence of pyridine to produce a compound having detergency properties.

The process of the invention can also be employed advantageously for the production of N-sulfated polysaccharides which are particularly important in the preparation of synthetic anticoagulants. In the field of anticoagulants a main objective has been to simulate as near as possible the molecular structure of heparin, a naturally occurring polysaccharide. Heparin is characterized by its high anticoagulant activity but, unfortunately, the cost of heparin is still relatively high. This accounts for the numerous attempts which have been made to produce synthetic anticoagulants similar in structure to heparin. Heparin is a polysaccharide containing glucosamine and glucuronic acid moieties connected by glycosidic linkages. It also contains sulfamic acid groups as well as O-sulfate groups, i.e., sulfate ester groups. [Jorpes et al., J. Biol. Chem. 183, 607 (1950).] Both groups are considered to be important contributors to the anticoagulant activity of heparin. (Doczi et al., loc cit.)

The presence of the important sulfamic acid group in the heparin molecule was suggested by Wolfram et al. [J. Am. Chem. Soc. 67, 748 (1945)] and subsequently substantiated by Jorpes et al. (loc. cit.). In addition, Meyer et al. [Helv. Chim. Acta, 33, 1651 (1950)] have also concluded that ten percent of the amino groups of heparin are free, and that the remaining ninety percent are in the sulfamic acid form.

Since the sulfamic acid group is a highly important substituent in the heparin molecule, attempts to synthetically duplicate the heparin molecular structure by sulfating other deacetylated polysaccharides have been made. One major disadvantage of the numerous attempts to duplicate the heparin molecule, however, has been the haphazard sulfation of both the amino and the hydroxy groups, i.e., hydroxy groups are also sulfated to a large extent, which obviously results in a smaller percentage of sulfated amino groups. This haphazard sulfation, unfortunately, results in a product which fails to substantially duplicate the heparin molecule and accordingly results in a product which is less efficient than heparin as an anticoagulant.

A second major disadvantage of the prior art processes is the fact that the sulfation is carried out in a heterogeneous system involving two solid components, i.e., both the starting materials as well as the end products are insoluble in the reaction mixture. Consequently the physical characteristics of the starting material must be carefully controlled to insure reasonable yields, and very frequently the particles of starting material become coated with reaction product which prevent further reaction. Consequently low yields are frequently encountered. This is in contrast to the applicant's process wherein the starting component is insoluble in the reaction mixture but the desired N-sulfated end component is soluble. Consequently as the reaction proceeds at the surface of the insoluble starting material, the reaction product readily dissolves in the aqueous medium and a fresh surface of the insoluble starting material is exposed for further reaction. By the continuation of such a process, it is apparent that very high yields of the desired N-sulfated end product will result.

The present invention, therefore, provides a novel process for the selective and substantially quantitative N-sulfation of polysaccharides containing amino groups and, in addition, provides a simple means for isolating the N-sulfated end product from unreacted starting material.

N-sulfated polysaccharides produced by the present process can be converted to a useful anticoagulant by reacting with known hydroxy sulfating agents, e.g., chlorosulfonic acid in carbon tetrachloride [Reeves et al., J. Am. Chem. Soc. 75, 4101 (1953)], to produce a compound which in addition to the quantitative amount of N-sulfate, or sulfamic acid groups, also contains a substantial quantity of O-sulfate or hydroxy sulfate groups. The O-sulfation can also be carried out with sulfur trioxide dissolved in sulfur dioxide.

The process of the present invention, therefore, provides a novel and useful tool in the preparation of amino acids, detergents, wetting agents, and anticoagulants from amino alcohols.

In carrying out the process of the present invention the amino alcohol is suspended or dissolved in water and the resulting suspension or solution is treated with a pyridine·sulfur trioxide complex. In those instances wherein a polymeric amino alcohol, a polysaccharide, is the starting compound the starting reaction mixture is a suspension whereas the monomeric amino alcohols are generally in solution. To the resulting aqueous mixture is added sufficient alkali, e.g., alkali-metal or alkaline-earth hydroxide or carbonate such as potassium hydroxide or carbonate, sodium hydroxide or carbonate, barium hydroxide or carbonate, calcium hydroxide or carbonate and the like to maintain a pH between about 7 and about 11.5 preferably between about 9 and 11 which results in the formation of an amino alcohol N-sulfonic acid metal salt. The reaction is generally carried out at a temperature between about zero and about fifty degrees centigrade, preferably between about ten and about 25 degrees centigrade. For the monomeric amino alcohols the reaction is completed in a period between about one-half hour to about six hours and with polymeric amino alcohols the reaction is completed between about ten and about 25 hours.

The amino alcohol N-sulfonic acid metal salts produced by the present process can be recovered from the reaction mixture by well known techniques. For example, polysaccharide N-sulfonic acid metal salts can be separated from the reaction mixture by concentrating the reaction mixture under vacuum to remove excess pyridine, dialyzing to remove the inorganic metal sulfate which is formed during the reaction, concentrating the solution in the dialysis bag under vacuum, adding a salt, e.g., about one percent by weight of sodium chloride, to the polysaccharide N-sulfonic acid metal salt solution and precipitating the product with about two volumes of alcohol or acetone.

Monomeric amino alcohol N-sulfonic acid metal salts can be recovered in some instances by removing excess pyridine under vacuum, adding sodium chloride and ethanol, removing the resulting inorganic precipitates by filtration, and recovering the N-sulfated product from the filtrate by the addition of acetone.

Isolation of the metal salt can also be accomplished by concentrating the reaction mixture to remove excess pyridine, adding ethanol, mixing the resulting oily layer with acetone to solidify the oily layer, heating the solid with absolute ethanol, extracting the residual solid with alcohol-water, treating the extract with acetone to incipient turbidity, filtering, and recovering the metal salt from the filtrate by mixing with an additional quantity of acetone.

The thus-produced amino alcohol N-sulfonic acid metal salt can readily be converted to the amino alcohol N-sulfonic acid by contacting an aqueous solution of the amino alcohol N-sulfonic acid metal salt with a strong acid cation exchange resin, more particularly a sulfonated-cross-linked polystyrene copolymer resin such as Amberlite IR–120 (Rohm and Haas Company) or Permutit Q (The Permutit Co.) (Chemical Week, December 18, 1954, page 43), and recovering the amino alcohol N-sulfonic acid from the eluate by evaporating to dryness.

The following examples are illustrative of the process and products of the present invention, but are not to be construed as limiting.

*Example 1.—Preparation of Sodium O-Sulfochitosan-N-Sulfonate*

A. *Sodium chitosan-N-sulfonate.*—Fifty-four grams of chitosan was suspended in 1000 milliliters of water, and dissolved by the addition of thirty milliliters of concentrated hydrochloric acid. The chitosan hydrochloride was then converted to free chitosan by the gradual addition of 48 milliliters of thirty percent sodium hydroxide with stirring. The resulting precipitate was very flocculent in character. The suspension of chitosan was stirred thoroughly, and pyridine·sulfur trioxide complex (U.S. Patent 2,697,093) was added to the aqueous suspension in small portions. As the pyridine·sulfur trioxide complex reacted, the pH of the reaction medium was maintained in the range of about nine to ten by the continual slow addition of a thirty percent sodium hydroxide solution. The reaction mixture was maintained at about 25 degrees centigrade. A total of about 280 grams of pyridine·sulfur trioxide complex and about 465 milliliters of 33 percent aqueous sodium hydroxide were added over a period of about twenty hours. During the course of the additions the chitosan dissolved and a clear, light brown solution resulted. This solution was concentrated under vacuum to about 1.5 liters to remove some dissolved pyridine. The concentrated solution was dialyzed in cellulose casings against deionized water to remove the sodium sulfate and other lower molecular weight materials. The light brown solution in the dialysis bag was concentrated under vacuum to 1260 milliliters (pH=9–10), and 12.6 grams of sodium chloride was dissolved in the clear solution. A light tan solid was precipitated by the addition of 2.5 liters of absolute ethanol. The mixture was refrigerated for twelve hours. The solid was removed by filtration, washed with two portions of absolute ethanol and three portions of acetone, and dried under vacuum at fifty degrees centigrade to yield 81.1 grams of sodium chitosan N-sulfonate.

*Analysis.*—Calcd. for $(C_6H_{10}O_4N)SO_3Na$: C, 27.37; H, 3.82; N, 5.32; S, 12.18; N-amino, 0.0. Found: C, 27.78; H, 4.05; N, 5.66; S, 12.35; N-amino, 0.18 (by titration).

B. *Chitosan-N-sulfonic acid.*—An aqueous mixture of sodium chitosan-N-sulfonate was introduced into a column of Amberlite IR–120 cation exchange resin regenerated in the hydrogen cycle and the resulting eluate was evaporated to dryness to yield chitosan-N-sulfonic acid.

C. *Sodium O-sulfochitosan-N-sulfonate.*—An eighteen gram sample of sodium chitosan-N-sulfonate (air dried, ca. ten percent moisture) was suspended in about 200 milliliters of liquid sulfur dioxide. While the suspension was being stirred, liquid sulfur trioxide (20 millilters =38.4 grams) was added in a dropwise manner. After the addition of the liquid sulfur trioxide, the reaction was allowed to proceed for 8 to 10 hours at the boiling point of liquid sulfur dioxide (ca. −10 degrees centigrade) in a dry nitrogen atmosphere. The insoluble reaction product was removed by filtration and washed three times with carbon tetrachloride.

The washed reaction product was then added in small portions to a rapidly stirred ice-water mixture. The reaction product was completely soluble in water. The solution was adjusted to pH of approximately ten, and concentrated under vacuum to remove a small quantity of emulsified carbon tetrachloride from the previous wash. The solution was then dialyzed against deionized water in a cellulose casing until the undialyzable material showed a negative test for sulfate ion with barium chloride. This dialyzed solution was concentrated under vacuum until the solid content was in the range of one to three percent. Sodium chloride was dissolved in the solution to a one percent level and the sodium O-sulfochitosan-N-sulfonate was precipitated by the addition of two volumes of absolute alcohol or acetone.

*Example 2.—Preparation of Sodium O-Sulfo-Neo-Hyaluronic Acid N-Sulfonate*

A. *Sodium neo-hyaluronic acid-N-sulfonate.*—In the same manner as shown in Example 1, part A, sodium neo-hyaluronic acid-N-sulfonate was prepared by utilizing neo-hyaluronic acid as the starting compound in lieu of chitosan.

B. *Neo-hyaluronic acid-N-sulfonic acid.*—In the same manner as shown in Example 1, part B, neo-hyaluronic acid-N-sulfonic acid was prepared by utilizing sodium neo-hyaluronic acid-N-sulfonate in lieu of sodium chitosan-N-sulfonate.

C. *Sodium O-sulfo-neo-hyaluronic acid-N-sulfonate.*—In the same manner as shown in Example 1, part C, sodium O-sulfo-neo-hyaluronic acid-N-sulfonate was prepared by utilizing sodium neo-hyaluronic acid-N-sulfonate in lieu of sodium chitosan-N-sulfonate.

*Example 3.—Preparation of Sodium O-Sulfo-Neo-Chondroitin Sulfate-N-Sulfonate*

A. *Sodium neo-chondroitin sulfate-N-sulfonate.*—In the same manner as shown in Example 1, part A, sodium neo-chondroitin sulfate-N-sulfonate was prepared by utilizing neo-chondroitin sulfate as the starting compound in lieu of chitosan.

B. *Neo-chondroitin sulfate-N-sulfonic acid.*—In the same manner as shown in Example 1, part B, neo-chondroitin sulfate-N-sulfonic acid was prepared by utilizing sodium neo-chondroitin sulfate-N-sulfonate in lieu of sodium chitosan-N-sulfonate.

C. *Sodium O - sulfo - neo - chondroitin sulfate - N - sulfonate.*—In the same manner as shown in Example 1, part C, sodium O-sulfo-neo-chondroitin sulfate-N-sulfonate was prepared by utilizing sodium neo-chondroitin sulfate-N-sulfonate in lieu of sodium chitosan-N-sulfonate.

*Example 4.—Preparation of β-Aminopropionic Acid Hydrochloride*

A. *Sodium 3 - aminopropanol - N - sulfonate.*—3-aminopropanol (7.5 grams) was dissolved in 130 milliliters of water; pH of the solution was 11.8. The solution was reacted with 12.6 grams of pyridine·sulfur trioxide complex added in portions over a period of 2½ hours, with sufficient ten percent sodium hydroxide added gradually to maintain a pH of about 11.3. At the end of the reaction time, the clear straw-colored solution was concentrated under vacuum to eighty milliliters. Sodium chloride (0.8 gram) was dissolved in the solution, and the inorganic salts (mostly sodium sulfate) were precipitated by the addition of 250 milliliters of absolute ethanol. After refrigeration, the finely divided white solid was removed by filtration. The filtrate yielded no further precipitate with the addition of another fifty milliliters of alcohol. The main reaction product was precipitated by the addition of 1000 milliliters of acetone and weighed 4.46 grams.

The product was recrystallized from hot 95 percent ethanol by the addition of acetone and then from absolute ethanol to produce sodium 3-aminopropanol-N-sulfonate.

*Analysis.*—Calcd. for $C_3H_8O_4NSNa$: C, 20.34; H, 4.55; N, 7.91; S, 18.09; Na, 12.98; N-amino, 0.0. Found: C, 21.26; H, 4.92; N, 7.89; S, 17.88; Na, 13.52 N-amino, 0.06.

B. *3-aminopropanol-N-sulfonic acid.*—In the same manner shown in Example 1, part B, 3-aminopropanol-N-sulfonic acid was prepared by utilizing sodium 3-aminopropanol-N-sulfonate as the starting compound in lieu of sodium chitosan-N-sulfonate.

C. *β-aminopropionic acid hydrochloride.*—0.35 gram of sodium 3-aminopropanol-N-sulfonate was dissolved in about ten milliliters of water and 0.4 gram of sodium carbonate was dissolved in the solution. Sodium permaganate (0.4 gram of $NaMnO_4 \cdot 3H_2O$) dissolved in about five milliliters of water was added to the reaction mixture at room temperature, and the oxidation was allowed to proceed for about sixteen hours. The permanganate was completely reduced to $MnO_2$ which was removed by filtration. The clear filtrate was mixed with hydrochloric acid and refluxed to obtain β-aminopropionic acid hydrochloride.

*Example 5.—Preparation of Iminodiacetic Acid Hydrochloride*

A. *Sodium diethanolamine-N-sulfonate.*—10.5 grams of diethanolamine was dissolved in 125 milliliters of water; pH of the solution was 10.8. This solution was stirred at room temperature and pyridine·sulfur trioxide complex was added in small portions. During the addition, dilute sodium hydroxide (ten percent solution) was added in portions to maintain the pH in the range of 9 to 10. A total of 17.7 grams pyridine·sulfur trioxide complex and 52 milliliters of ten percent sodium hydroxide were added over a period of 1½ hours.

The reaction mixture was then concentrated under vacuum to 100 milliliters to remove excess pyridine. One gram of sodium chloride was dissolved in the clear solution, and 500 milliliters of absolute ethanol was added. After refrigerating for twelve hours, 3.3 grams of solid was removed by filtration. The filtrate was mixed with 400 milliliters of acetone, and needle-like crystals began to separate. After refrigerating, 9.05 grams of sodium diethanolamine-N-sulfonate was removed by filtration. The compound melted at 218–220 degrees centigrade on a Fisher block.

*Analysis.*—Calcd. for $C_4H_{10}O_5NSNa$: C, 23.19; H, 4.86; N, 6.76; S, 15.47; Na, 11.10. Found: C, 23.23; H, 5.04; N, 7.10; S, 15.71; Na, 11.10.

B. *Diethanolamine-N-sulfonic acid.*—In the same manner as shown in Example 1, part B, diethanolamine-N-sulfonic acid was prepared by utilizing sodium diethanolamine-N-sulfonate as the starting compound in lieu of sodium chitosan-N-sulfonate.

C. *Iminodiacetic acid hydrochloride.*—In the same manner as shown in Example 4, part C, iminodiacetic acid hydrochloride [$HN(CH_2COOH)_2 \cdot HCl$] was prepared by oxidizing the alcohol radical and hydrolyzing to reconvert the sulfamic acid radical to an amino group.

*Example 6.—Preparation of Aminomalonic Acid Hydrochloride*

A. *Sodium D,L-serine-N-sulfonate.*—A solution of D,L-serine (2-amino-3-hydroxy propanoic acid) was prepared by suspending 10.2 grams of D,L-serine in 100 milliliters of water and adding 36 milliliters of ten percent sodium hydroxide solution; pH of the solution was 10.05. The clear solution was reacted with 18.1 grams of pyridine·sulfur trioxide complex which was added in portions over a period of about 3¾ hours. During this addition the pH was regulated in the range of about 9.3 to 10.5 by the continual addition of ten percent sodium hydroxide solution. At the end of this reaction time the light yellow solution was concentrated under vacuum to 225 milliliters, and 525 milliliters of absolute ethanol was added to yield a slightly milky supernatant liquid and an oily layer.

The supernatant liquid was removed by decantation, and the oily layer was thoroughly mixed with acetone and refrigerated for twelve hours. The oily layer solidified and 23.3 grams of solid product was obtained.

A suspension of ten grams of the solid product in 100 milliliters of absolute ethanol was heated to boiling and the milky supernatant liquid was decanted.

The residual solid was then extracted with 175 milliliters of a hot alcohol-water mixture (100 milliliters ethanol—75 milliliters water). The extraction was repeated with 100 milliliters of a 50–50 alcohol-water solution at the boiling point. These two extracts were combined, and treated with acetone to incipient turbidity. After about one hour, a small quantity of solid material was removed by filtration, and the clear filtrate was mixed with an equal volume of acetone. Fluffy needle-shaped crystals formed in the solution, and after refrigerating for twelve hours 5.5 grams of crystals were removed by filtration. This material was recrystallized from an alcohol-water mixture by the addition of acetone to incipient turbidity at thirty degrees centigrade. The product, sodium D,L-serine-N-sulfonate was obtained by refrigeration as white needle-shaped crystals weighed 2.63 grams, and melted with decomposition between 205.8 to 206.8 degrees centigrade.

*Analysis.*—Calcd. for $C_3H_5O_6NSNa_2$: C, 15.73; H, 2.20; N, 6.11; S, 13.99; Na, 20.08; N-amino, 0.0. Found: C, 15.51; H, 2.89; N, 6.27; S, 13.82; Na, 19.45; N-amino, 0.08.

B. *D,L-serine-N-sulfonic acid.*—In the same manner as shown in Example 1, part B, D,L-serine-N-sulfonic acid was prepared by utilizing sodium D,L-serine-N-sulfonate as the starting compound in lieu of sodium chitosan-N-sulfonate.

C. *Glycine hydrochloride.*—In the same manner as shown in Example 4, part C, glycine hydrochloride was prepared by oxidizing the alcohol radical of sodium D,L-serine-N-sulfonate and refluxing the oxidized product in dilute hydrochloric acid.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A process for selectively sulfating the amino group of an amino alcohol without sulfating the hydroxy group comprising the step of reacting an amino alcohol with a pyridine·sulfur trioxide complex in an aqueous alkaline medium at a pH between about seven and about 11.5.

2. A process for selectively sulfating the amino group of an amino alcohol without sulfating the hydroxy group comprising the step of reacting an amino alcohol with a pyridine·sulfur trioxide complex in an aqueous alkaline medium at a pH between about nine and about 11.

3. A process for selectively sulfating the amino groups of a polysaccharide containing amino groups without sulfating the hydroxy groups comprising the step of reacting a polysaccharide containing amino groups with a pyridine·sulfur trioxide complex in an aqueous alkaline medium at a pH between about seven and about 11.5 to produce a polysaccharide-N-sulfonic acid metal salt free of hydroxy sulfate groups.

4. A process for selectively sulfating the amino groups of a mucopolysaccharide selected from the group consisting of chitosan, neo-hyaluronic acid, and neo-chondroitin sulfate without sulfating the hydroxy groups comprising the step of reacting the mucopolysaccharide with a pyridine·sulfur trioxide complex in an aqueous alkaline medium at a pH between about nine and about eleven to produce a mucopolysaccharide-N-sulfonic acid metal salt free of hydroxy sulfate groups.

5. A process for selectively sulfating the amino groups of chitosan without sulfating the hydroxy groups comprising the step of reacting chitosan with a pyridine·sulfur trioxide complex in an aqueous alkaline medium at a pH between about nine and about eleven to produce a chitosan-N-sulfonic acid metal salt free of hydroxy sulfate groups.

6. A process for selectively sulfating the amino groups of neo-chondroitin sulfate without sulfating the hydroxy groups comprising the step of reacting neo-chondroitin sulfate with a pyridine·sulfur trioxide complex in an aqueous alkaline medium at a pH between about nine and about eleven to produce a neo-chondroitin sulfate N-sulfonic acid metal salt free of hydroxy sulfate groups.

7. A process for selectively sulfating the amino groups of neo-hyaluronic acid without sulfating the hydroxy groups comprising the step of reacting neo-hyaluronic acid with a pyridine·sulfur trioxide complex in an aqueous alkaline medium at a pH between about nine and about eleven to produce a neo-hyaluronic acid-N-sulfonic acid metal salt free of hydroxy sulfate groups.

8. Sodium neo-hyaluronic acid-N-sulfonate completely free of hydroxy sulfate groups.

9. Chitosan-N-sulfonic acid completely free of hydroxy sulfate groups.

10. Sodium chitosan-N-sulfonate completely free of hydroxy sulfate groups.

11. Neo-hyaluronic acid-N-sulfonic acid completely free of hydroxy sulfate groups.

12. A metal salt of chitosan-N-sulfonic acid completely free of hydroxy sulfate groups in which the metal is selected from the group consisting of alkali-metal and alkaline earth metals.

13. A metal salt of neo-hyaluronic acid-N-sulfonic acid completely free of hydroxy sulfate groups in which the metal is selected from the group consisting of alkali-metal and alkaline earth metals.

References Cited in the file of this patent

UNITED STATES PATENTS

| | | |
|---|---|---|
| 2,212,521 | Harris | Aug. 27, 1940 |
| 2,337,693 | Tryon | Dec. 28, 1943 |
| 2,508,433 | Snyder | May 23, 1950 |
| 2,832,766 | Wolfrom | Apr. 29, 1958 |

OTHER REFERENCES

Gordon et al.: Ind. Eng. Chem. 31, 1237–38 (1939).
Karrer et al.: Helv. Chim. Acta 26, 1309 (1943).